(12) United States Patent
Brown, IV et al.

(10) Patent No.: US 12,039,143 B2
(45) Date of Patent: *Jul. 16, 2024

(54) REAL-TIME PREVIEW OF CONNECTABLE OBJECTS IN A PHYSICALLY-MODELED VIRTUAL SPACE

(71) Applicant: Magic Leap, Inc., Plantation, FL (US)

(72) Inventors: Edmund Graves Brown, IV, Weston, FL (US); Javier Antonio Busto, Plantation, FL (US); Jeffrey A. Scott, Tamarac, FL (US); Jeremy Vanhoozer, Delray Beach, FL (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,074

(22) Filed: Apr. 27, 2023

(65) Prior Publication Data

US 2023/0266857 A1 Aug. 24, 2023

Related U.S. Application Data

(63) Continuation of application No. 17/308,920, filed on May 5, 2021, now Pat. No. 11,669,218, which is a
(Continued)

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/017* (2013.01); *G06F 3/04845* (2013.01); *G06F 3/14* (2013.01)

(58) Field of Classification Search
CPC ........ G06F 3/04815; G06F 3/017; G06F 3/14; G06F 3/04845; G06F 1/163; G06F 3/011;
(Continued)

(56) References Cited

U.S. PATENT DOCUMENTS 6,850,221 B1 2/2005 Tickle
7,979,251 B2 7/2011 Jakobsen et al.
(Continued)

OTHER PUBLICATIONS

Adams, et al., "Virtual Training for a Manual Assembly Task," The Electronic Journal of Haptics Research, vol. 2, No. 2, Oct. 17, 2001.
(Continued)

*Primary Examiner* — Phi Hoang
(74) *Attorney, Agent, or Firm* — KLINTWORTH & ROZENBLAT IP LLP

(57) ABSTRACT

Virtual reality (VR), augmented reality (AR), and/or mixed reality (MR) systems may enable one or more users to connect two or more connectable objects together. These connectable objects may be real objects from the user's environment, virtual objects, or a combination thereof. A preview system may be included as a part of the VR, AR, and/or MR systems that provide a preview of the connection between the connectable objects prior to the user(s) connecting the connectable objects. The preview may include a representation of the connectable objects in a connected state along with an indication of whether the connected state is valid or invalid. The preview system may continuously physically model the connectable objects while simultaneously displaying a preview of the connection process to the user of the VR, AR, or MR system.

18 Claims, 16 Drawing Sheets

Related U.S. Application Data continuation of application No. 16/508,197, filed on Jul. 10, 2019, now Pat. No. 11,029,805.

(51) Int. Cl.
  *G06F 3/04845* (2022.01)
  *G06F 3/14* (2006.01)

(58) Field of Classification Search
  CPC ...... G06F 3/013; G06F 3/0304; G06F 1/1686; G06F 3/147; G02B 27/0093; G02B 2027/0138; G02B 27/0172; G06V 20/20
  See application file for complete search history.

(56) References Cited

U.S. PATENT DOCUMENTS

| | | |
|---|---|---|
| 9,081,426 B2 | 7/2015 | Armstrong |
| 9,215,293 B2 | 12/2015 | Miller |
| 9,348,143 B2 | 5/2016 | Gao et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 11,029,805 B2 | 6/2021 | Brown et al. |
| 11,262,899 B2 | 3/2022 | Wallington |
| 2006/0028436 A1 | 2/2006 | Armstrong |
| 2007/0081123 A1 | 4/2007 | Lewis |
| 2007/0262984 A1 | 11/2007 | Pruss |
| 2011/0035802 A1 | 2/2011 | Arajujo, Jr. |
| 2012/0127062 A1 | 5/2012 | Bar-Zeev et al. |
| 2012/0162549 A1 | 6/2012 | Gao et al. |
| 2012/0294539 A1 | 11/2012 | Lim |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt et al. |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2018/0045963 A1 | 2/2018 | Hoover |
| 2018/0181274 A1 | 6/2018 | Jung |
| 2018/0190020 A1 | 7/2018 | Mullins |
| 2019/0240581 A1 | 8/2019 | Walker et al. |
| 2019/0317718 A1 | 10/2019 | George et al. |
| 2020/0012107 A1 | 1/2020 | Greenberg |
| 2021/0011606 A1 | 1/2021 | Brown et al. |
| 2021/0335047 A1 | 10/2021 | Heun et al. |
| 2022/0172439 A1* | 6/2022 | Takamizawa ......... G06T 19/006 |

OTHER PUBLICATIONS

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC—Chapel Hill, NC, Feb. 1995.

Bimber, et al., "Spatial Augmented Reality—Merging Real and Virtual Worlds," 2005 https://web.media.mitedu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Sankar Jayaram, Hugh I Connacher, Kevin W Lyons, Virtual assembly using virtual reality techniques, Computer-Aided Design, vol. 29, Issue 8, 1997, pp. 575-584. (Year: 1997).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Yuan, Miaolong & Ong, S K & Nee, Andrew. (2004). Assembly Guidance in Augmented RealityVirtual Interactive Tool. (Year: 2004).

* cited by examiner

EXAMPLE USER INTERACTIONS WITH A WEARABLE DEVICE

REAL-TIME PREVIEW OF CONNECTABLE OBJECTS IN A PHYSICALLY-MODELED VIRTUAL SPACE

CROSS-REFERENCE TO RELATED APPLICATIONS

This application is a continuation of U.S. application Ser. No. 17/308,920, filed May 5, 2021, entitled "REAL-TIME PREVIEW OF CONNECTABLE OBJECTS IN A PHYSICALLY-MODELED VIRTUAL SPACE". U.S. application Ser. No. 17/308,920 is continuation of U.S. application Ser. No. 16/508,197, filed Jul. 10, 2019, entitled "REAL-TIME PREVIEW OF CONNECTABLE OBJECTS IN A PHYSICALLY-MODELED VIRTUAL SPACE". This application claims priority to U.S. application Ser. No. 17/308,920 and U.S. application Ser. No. 16/508,197, each of which is incorporated herein by reference.

TECHNICAL FIELD

The present disclosure relates to virtual reality and augmented reality, including mixed reality, imaging and visualization systems and more particularly to systems and methods for previewing an outcome of connecting objects in virtual, augmented, or mixed reality.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

Certain virtual reality (VR), augmented reality (AR), and/or mixed reality (MR) systems may enable one or more users to connect two or more connectable objects together. These connectable objects may be real objects from the user's environment, virtual objects, or a combination thereof. Aspects of this disclosure relate to a preview system which may be included as a part of the VR, AR, and/or MR systems that provide a preview of the connection between the connectable objects prior to the user(s) connecting the connectable objects. The preview may include a representation of the connectable objects in a connected state along with an indication of whether the connected state is valid or invalid. The preview system may continuously physically model the connectable objects while simultaneously displaying a preview of the connection process to the user of the VR, AR, or MR system.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Certain virtual reality (VR), augmented reality (AR), and/or mixed reality (MR) systems may enable one or more users to connect two or more connectable objects together. These connectable objects may be real objects from the user's environment, virtual objects, or a combination thereof. Aspects of this disclosure relate to a preview system which may be included as a part of the VR, AR, and/or MR systems that provide a preview of the connection between the connectable objects prior to the user(s) connecting the connectable objects. The preview may include a representation of the connectable objects in a connected state along with an indication of whether the connected state is valid or invalid. The preview system may continuously physically model the connectable objects while simultaneously displaying a preview of the connection process to the user of the VR, AR, or MR system.

Examples of 3D Display of a Wearable System

A wearable system (also referred to herein as an AR system) can be configured to present two-dimensional (2D) or three-dimensional (3D) virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

Figure 1:
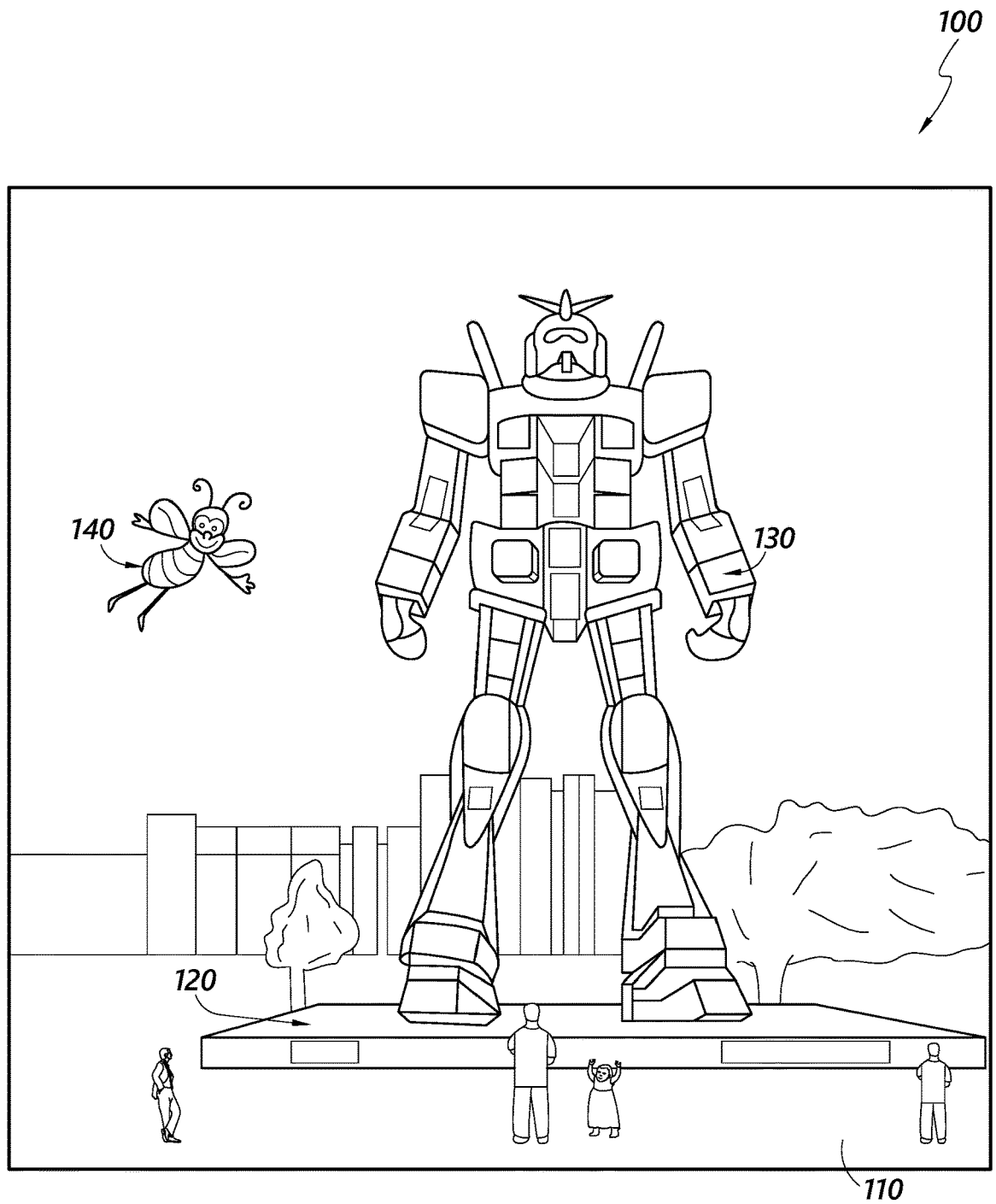
FIG. 1 depicts an illustration of a mixed reality scenario with certain virtual reality objects, and certain physical objects viewed by a person.

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
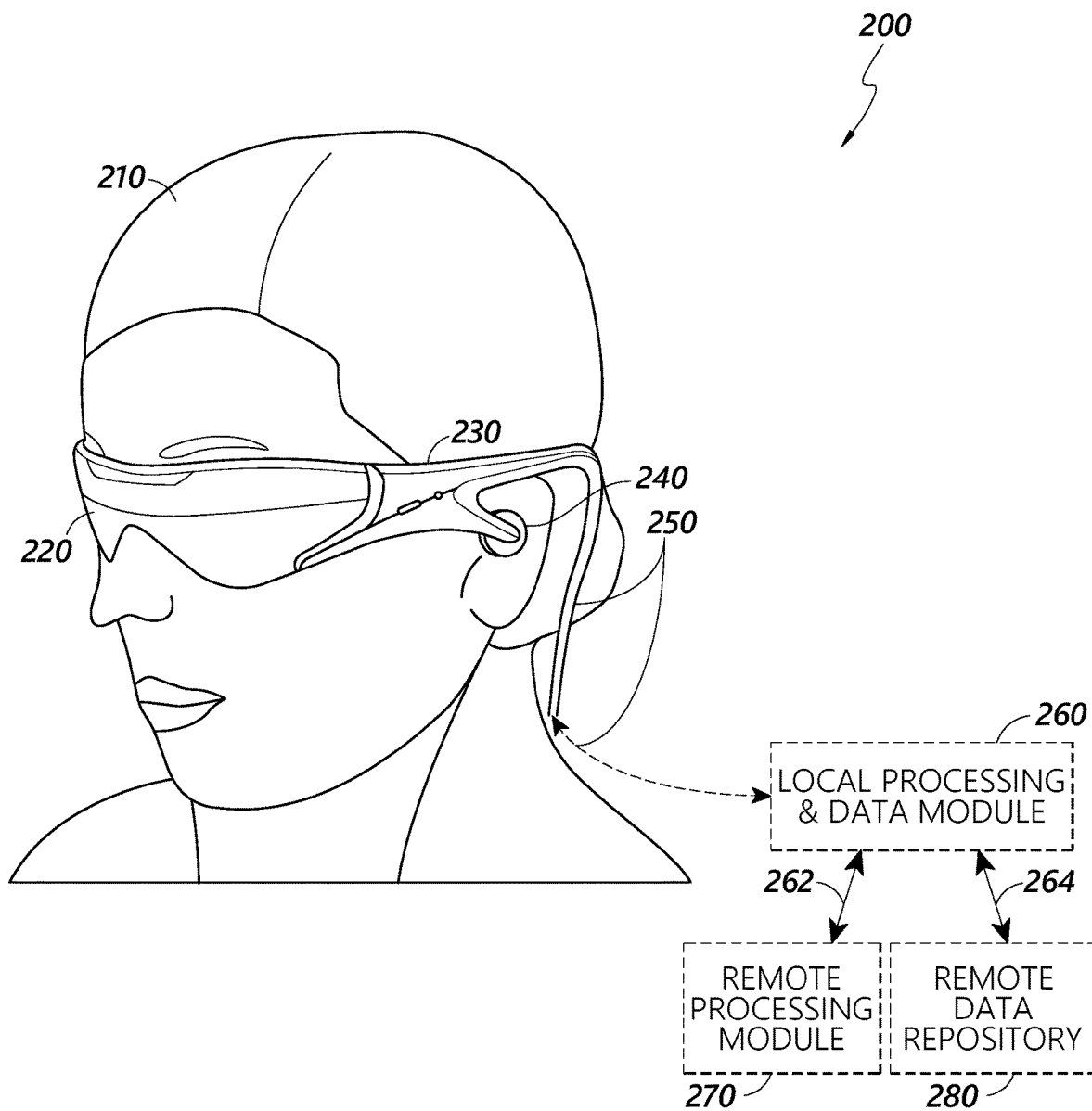
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

Figure 3:
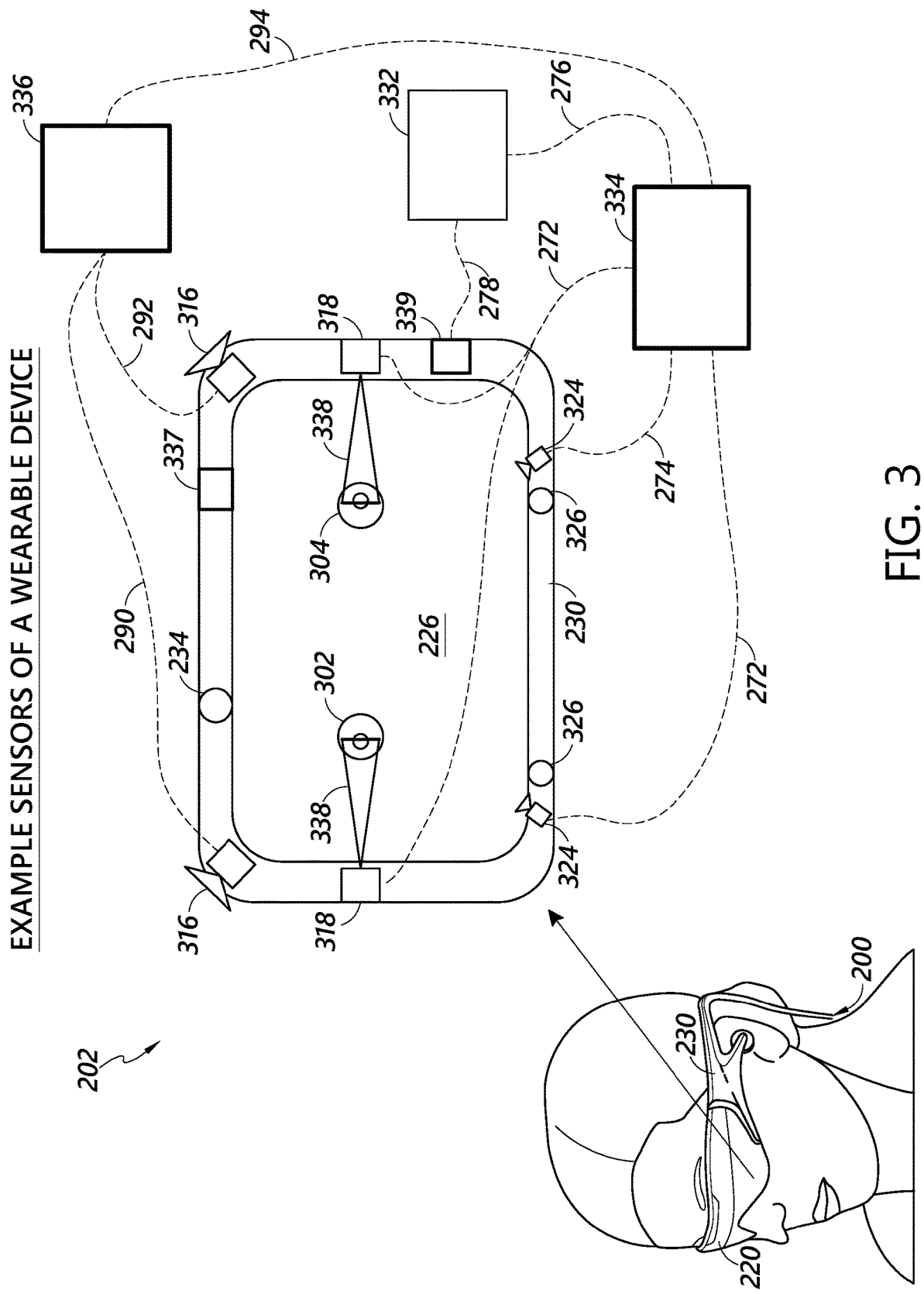
FIG. 3 schematically illustrates example components of a wearable system.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module Example Components of a Wearable System FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 4. The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
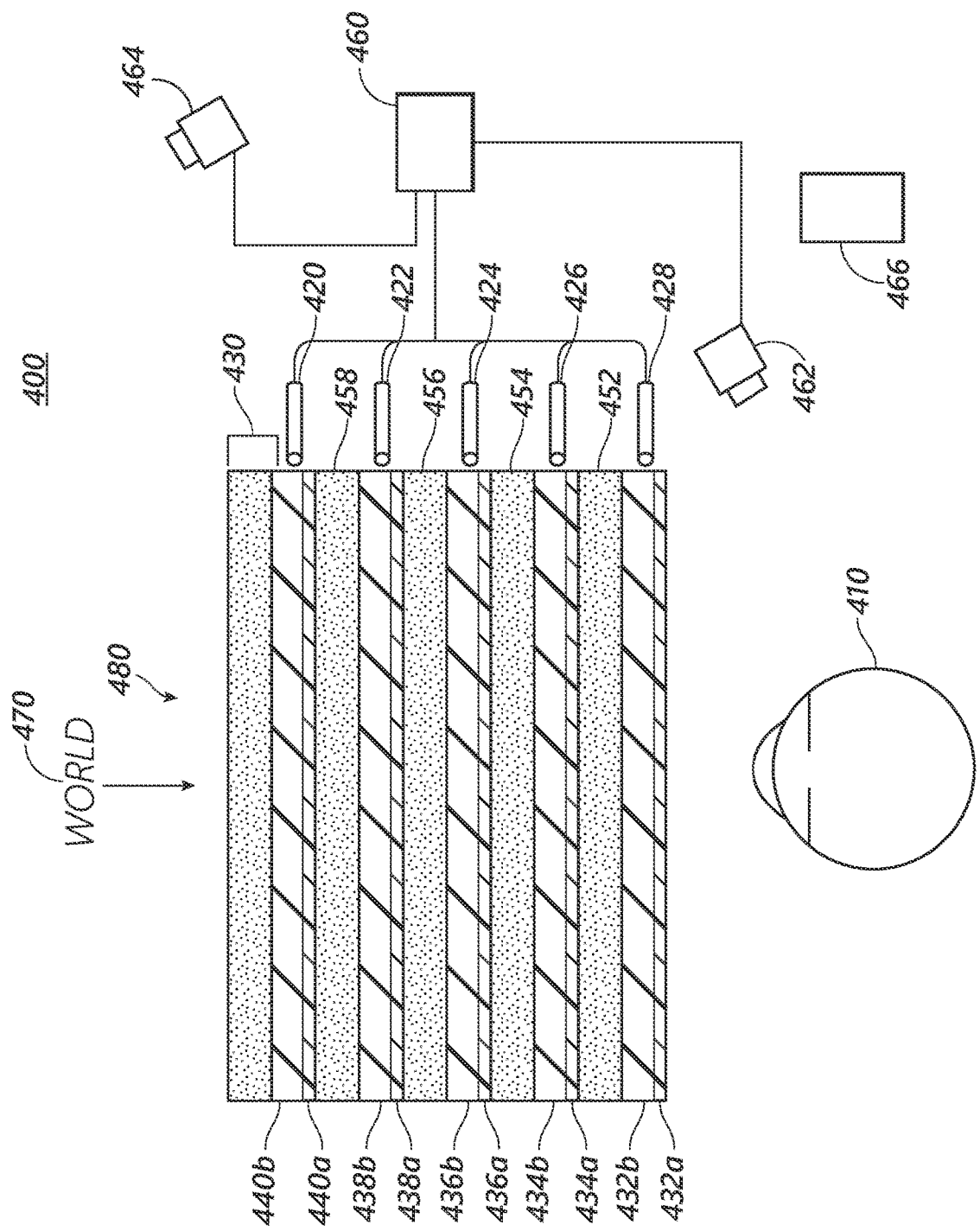
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below.

Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include 4π steradians of solid angle surrounding the wearable system because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), an outward facing camera configured to detect gestures of a user, and so forth. The user input device 466 can include an electromyographic (EMG) sensor to sense electrical activity from skeletal muscles, for example, to measure a user's intent to move his or her fingers or arm. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with a Wearable System

Figure 5:
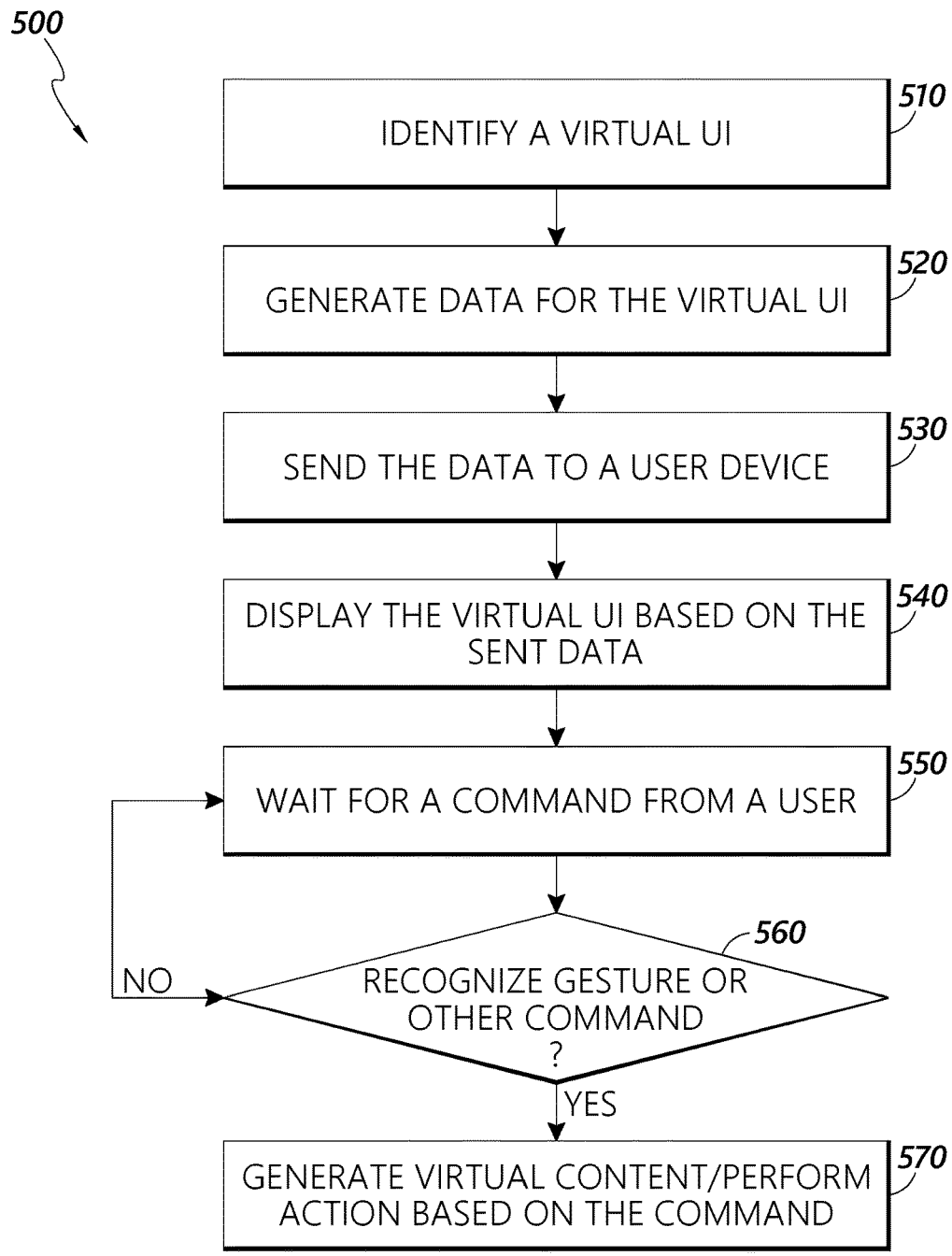
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Preview System for Connectable Objects

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
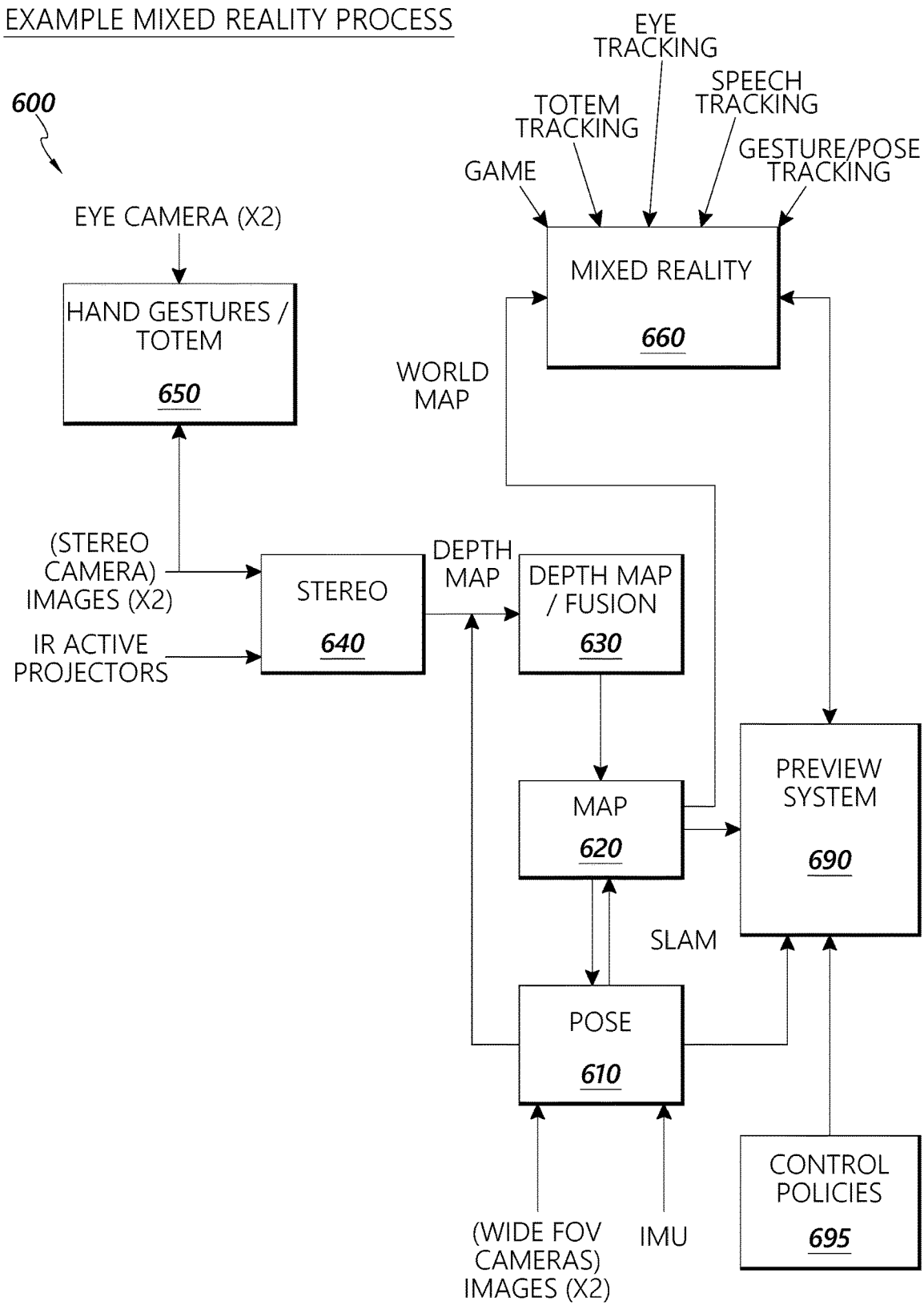
FIG. 6A is a block diagram of another example of a wearable system which can comprise a preview system for connectable objects.

FIG. 6A is a block diagram of another example of a wearable system which can comprise a preview system 690 for connectable objects in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras).

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise a preview system 690 for connectable objects. The preview system 690 can be configured to generate, update, animate, and render previews for the outcome of one or more users attempting to connect connectable objects in an AR, VR, or MR environment. As will be further described with reference to FIGS. 6B, 10A-10D, and 11, the preview system 690 can provide a preview of the connection between two or more connectable objects prior to user(s) connecting the connectable objects. The preview may include a representation of the connectable objects in a connected state along with an indication of whether the connected state is valid or invalid.

Some or all of the preview system 690 can be implemented as part of the local processing and data module 260 or the remote processing module 262, 264 alone or in combination. In various embodiments, the preview system 690 can receive user input from multiple different wearable devices in situations where multiple users are interacting with the connectable objects in the AR, VR, or MR environment. For example, a first user with a first wearable device may be manipulating an active virtual object (e.g., a pipe) to attempt to connect the active virtual object to a target object (e.g., a pipe fitting or a pipe joint). A second user with a second wearable device may be holding the target object (real or virtual) during this manipulation. The first user's wearable device and the second user's wearable device (or other such wearable devices) can communicate via a network, for example, as will be described with reference to FIG. 9, and the preview system 690 can display to the first and second users, via their respective first and second wearable devices, a preview of the connection operation.

Figure 6B:
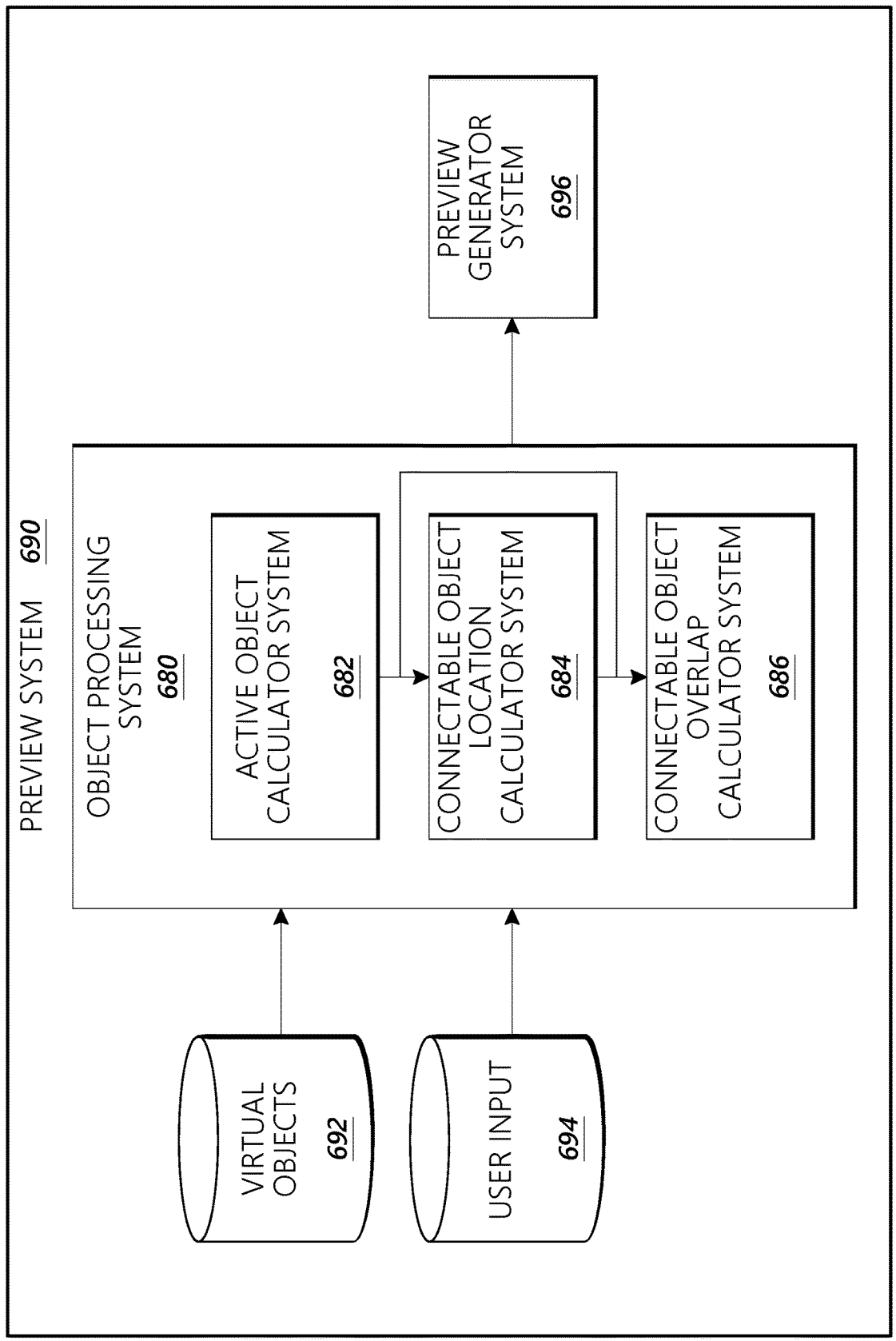
FIG. 6B illustrates example components of a preview system for connectable objects.

FIG. 6B illustrates an example preview system 690. The preview system 690 can implement a preview of two or more connectable objects including a representation of the connectable objects in a connected state along with an indication of whether the connected state is valid or invalid described with reference to FIGS. 10-11. The preview system 690 can include a virtual objects 692 data store, a user input 694 data store, an object processing system 680, and a preview generator system 696. The object processing system 680 can include an active object calculator system 682, a connectable object calculator system 684, and a connectable object overlap calculator system 686.

The virtual objects data store 692 can store information for a plurality of objects within a scene. For example, the virtual objects data store 692 can include a list of two or more virtual objects. In some embodiments, the list of virtual objects can also include a virtual representation of one or more objects in the real-world. The virtual objects data store 692 can also include spatial information for each of the virtual objects in the list of virtual objects. In some embodiments, the virtual objects data store 692 further includes a list of two or more connectable objects. The virtual objects data store 692 can further include, for each of the connectable objects, one or more nodes defining point(s) in space with respect to the corresponding connectable virtual object at which the connectable virtual object can be connected to another connectable virtual object.

The user input data store 694 can store information received from a user input device configured to receive user input in an environment of a user of an AR system including the preview system 690. The user input device can be embodied as any device configured to receive user input, such as the examples listed above in connection with the user input device 466.

The object processing system 680 can receive input from each of the virtual objects data store 692 and the user input data store 694 and provide the preview generator system 696 with spatial and rotational information for each of the virtual objects in the scene required to generate a preview of an active object connected to a target connectable object.

The active object calculator system 682 can identify one or more of the connectable objects as an active object based on the user input received from the user input data store 694 and the list of connectable objects received from the virtual objects data store 692. In some embodiments, an active object can be a virtual object that has been selected to be manipulated by the user.

The connectable object location calculator system 684 can determine a preview position and a preview rotation of the active object if the active object were connected to a target object. This position and rotation of the active object can be used when displaying a preview of the connection between the active object and the target object.

The connectable object overlap calculator system 686 can determine whether the active object would overlap another object in the list of virtual objects when located at the preview position and the preview rotation. The preview generator system 696 can generate a preview of the active object during a connection operation or when connected to the target connectable object. The preview may include a visual indication of whether the connection between the active object and the candidate connectable object is valid (e.g., the active and target objects may be validly connected together without violating physical or virtual constraints).

Examples of Mapping a User's Environment

Figure 7:
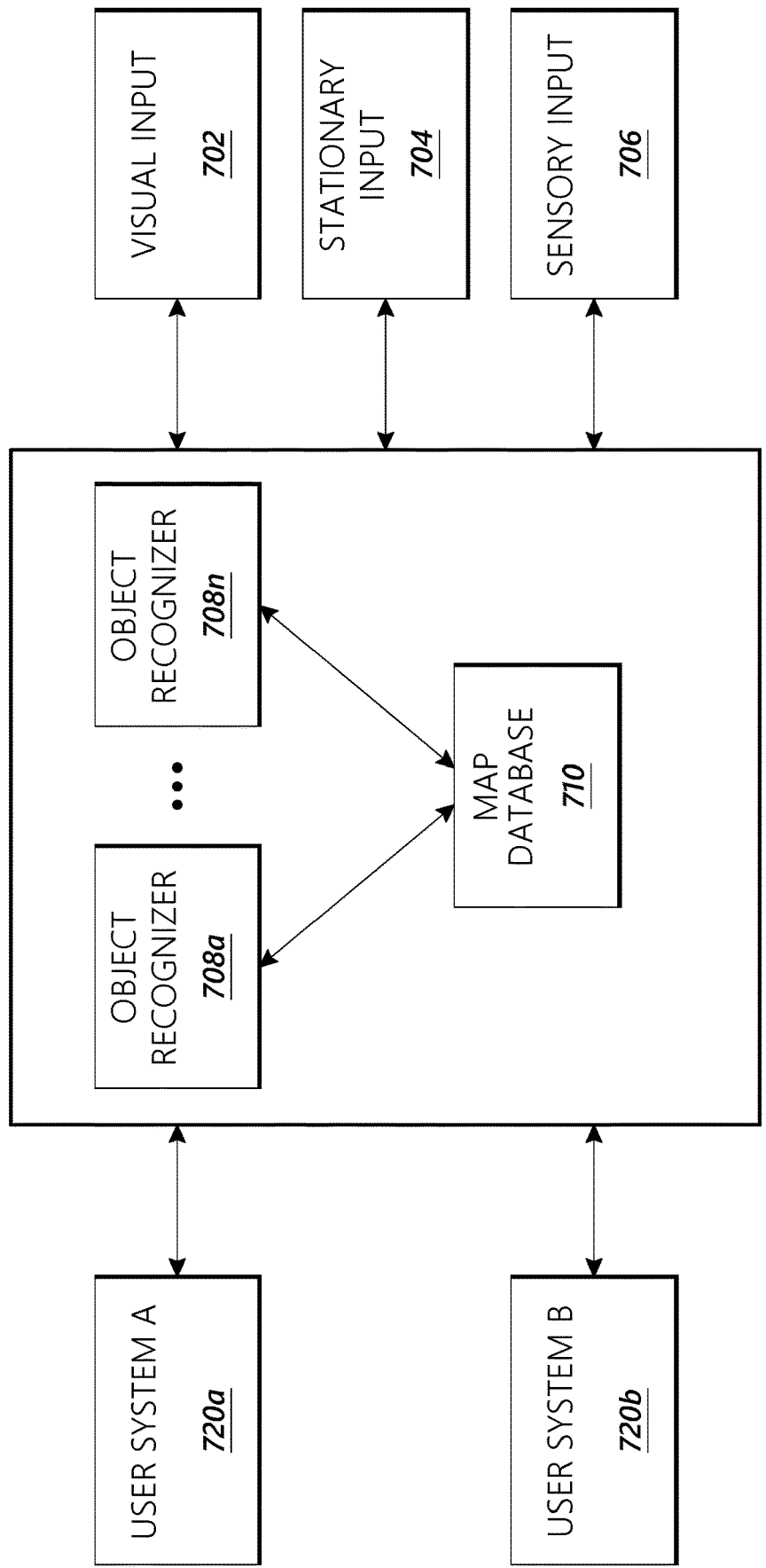
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, doors, user input devices, televisions, documents, other objects in the user's environment, etc. One or more object recognizers may be specialized for object with certain characteristics. For example, the object recognizer 708a may be used to recognizer faces, while another object recognizer may be used recognize cuboidal objects (e.g., desks, chairs, sofas, tables, etc.).

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons, objects, or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
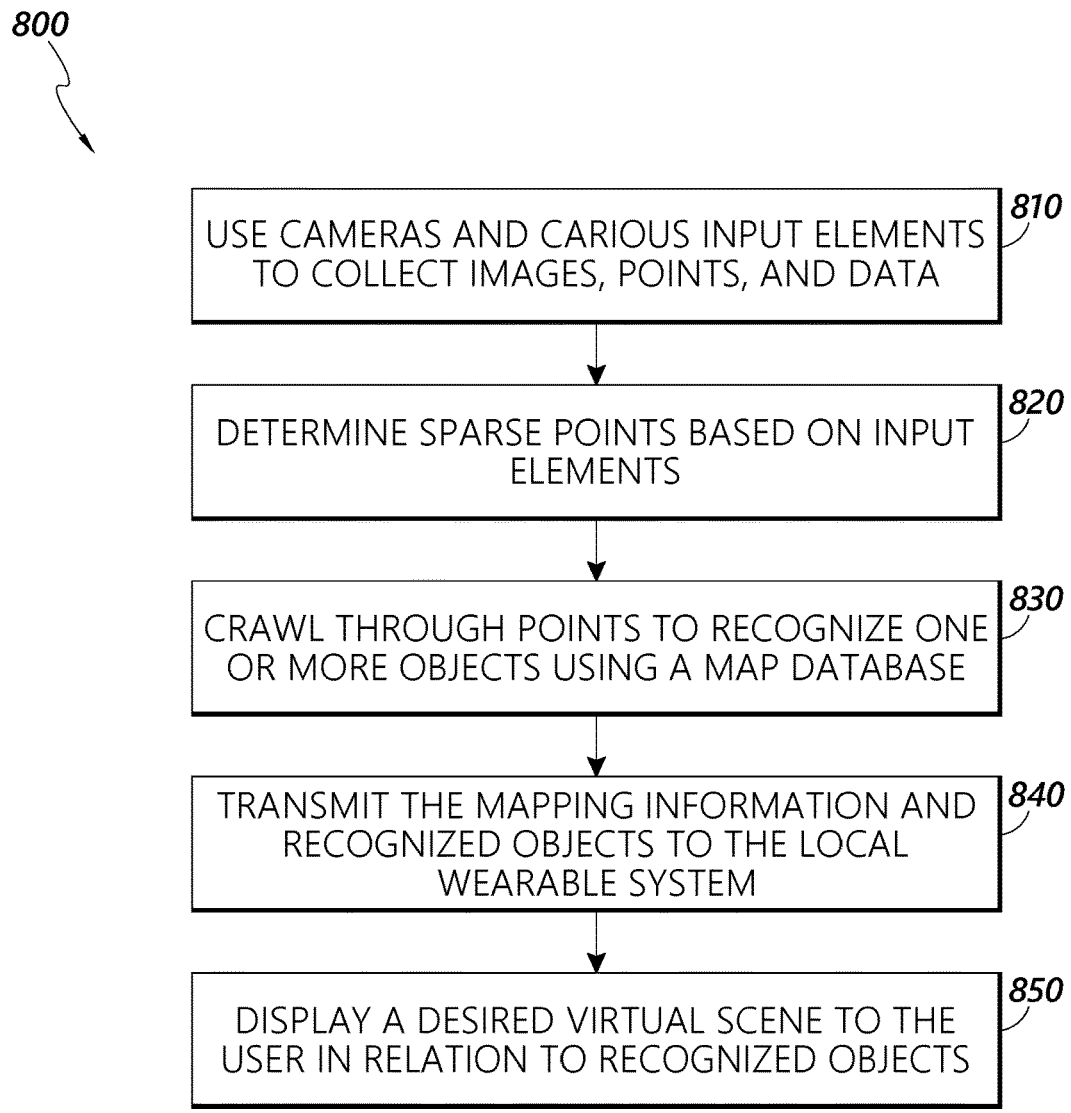
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications Among Multiple Wearable Systems

Figure 9:
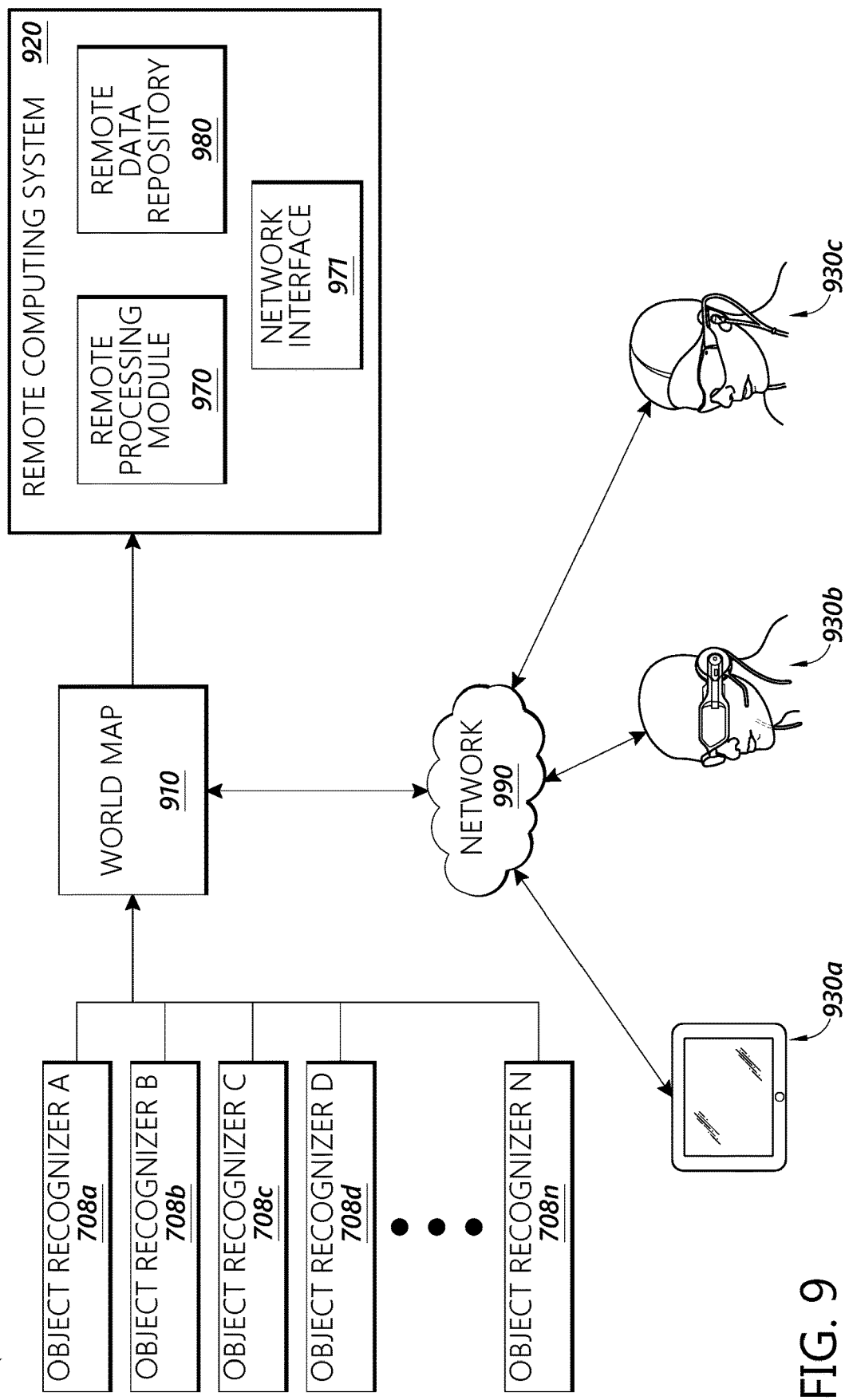
FIG. 9 schematically illustrates an overall system view depicting multiple wearable systems interacting with each other.

FIG. 9 schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain or receive information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g., 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g., 930a, 930b, 930c) to process information about the user and the user's environment. The remote computing system 920 can modify the information acquired by the user devices (e.g., 930a, 930b, 930c), such as, e.g. selectively cropping a user's image, modifying the user's background, adding virtual objects to the user's environment, annotating a user's speech with auxiliary information, etc. The remote computing system 920 can send the processed information to the same and/or different user devices.

Example Preview System for Connectable Objects

When using certain AR systems, one or more users may be able to manipulate the position and orientation of virtual objects within a scene. As used herein, the terms "object" or "virtual object" can refer to anything that has a virtual representation in the AR system. The term "scene" can refer to the collection of all virtual objects currently recognized by the AR system. As previously described, virtual objects may include objects which have no corresponding real-world analog within the scene as well as virtual representations of objects existing in the real-world. Virtual objects may also include semantic labels with a location in space, for example, a wall socket may be represented as a semantic label. The AR system may allow certain virtual objects to be connected together by the user(s). Such virtual objects may be referred to as connectable objects herein.

Some AR systems that allow users to connect objects may only allow users to connect objects with either prescriptive or purely virtual methods. Prescriptive methods may only allow users to manipulate previews "in situ," changing the preview object and other relevant information (such as rotation and scale) after the user identifies a point at which the user wishes to attach another object. Requiring the user to identify the point of connection reduces user exploration of emergent possibilities using a given set of objects. Since such exploration may be a key factor in rapid learning, prescriptive methods may not fully facilitate rapid learning for users. Purely virtual methods may only allow users to move a preview object in virtual space, either as a "ghost" with no solid physical properties or as an object that does not collide with objects in the real world. Thus, purely virtual methods require the user to move the preview object to the desired location of a connection before feedback on the validity of the connection is provided to the user.

Aspects of this disclosure relate to an AR system which can automatically provide a preview of a connection between two or more connectable objects as user(s) move connectable object(s) within a scene. As the user(s) manipulate object(s) within the scene, the system may run a number of background calculations to continually update the representation of the virtual objects within the scene to the user(s) in real-time. One such calculation may involve performing a physical simulation which simulates the physical properties of each of the virtual objects as though the virtual objects were subject to physical laws. For example, the physical simulation may prevent objects from occupying the same space in the scene, simulating the physical law that solid objects cannot occupy the same space. A variety of physical laws can be simulated to produce a scene including a plurality of virtual objects, for example, gravity, electricity or magnetism, physical or chemical properties (e.g., solid, liquid, or gas; hardness or softness; elasticity; mass, size, area, or volume; composition; color, reflectivity), and so forth.

One way in which the user(s) can interact with the virtual object is to allow the user(s) to connect certain virtual objects together. That is, some virtual objects within the AR system can be defined as connectable objects which can be connected to other connectable objects in a manner analogous to physical connections between real world-objects. For example, a connectable object representing an electrical plug can be connected to a connectable object representing an electrical outlet. In another example, connectable objects representing a pipe and a pipe joint can be connected together. The connectable objects can represent any connectable objects including construction blocks (e.g., Lego®), nuts and bolts, USB connectors and receptacles, coffee cups and lids, or any other virtual representation of connectable objects. In some embodiments, a connectable object may be one or more pieces that fit together in such a way that two objects behave as one after connection. In some embodiments, a first connectable object may be merged with a second connectable object to form a combined single object after connection.

The physical simulations of connectable objects may be able to determine whether or not the attempted connection of two or more objects by the user(s) is physically possible.

There are a number of situations in which such an attempted connection cannot be physically completed. For example, a pipe and pipe joint may have different diameters, preventing the pipe and pipe joint from being connected together. In another example, an electrical outlet may have a different standard than an electric plug the user(s) is trying to connect thereto (e.g., the plug and outlet may conform to different international standards).

Aspects of this disclosure relate to a preview system which allows user(s) to preview the outcome of connecting two connectable objects while using an AR system. By providing a preview to the user(s), the AR system can provide real-time feedback to the user(s) without suspending simulated physical forces and constraints of the physical simulation. There are a number of benefits associated with providing such preview(s) to the user(s). The preview can include a virtual representation of how two or more connectable objects will end up being connected to each other given their current relative position and orientation. The preview can also display additional information about the compatibility of the connection when the connection is invalid according to the physical simulation. For example, the preview may include an indication that a pipe joint has the wrong gauge and cannot be connected to a pipe. In another example, the preview can include an indication that a bolt is the right diameter, but the wrong length for a certain application. Such information regarding the incompatibility of two objects (e.g., the previewed connection is invalid) may be in the form of text or graphics (e.g., displayed by the display 220), an audible message (e.g., produced by the speaker 240), haptic feedback (e.g., produced by the totem 466 or other haptic device), etc.

Aspects of this disclosure can thus provide a natural interface for any AR system that allows user(s) to connect two or more connectable objects together. Such AR system can include connecting two or more connectable objects for: entertainment (combining building blocks), mechanical engineering (assembling components), architecture, education, training, etc. One benefit of the systems describe herein are the natural user interface, which can maintain the physical simulation while the user(s) manipulate objects in the environment, and which can lower the complexity of the user interface. That is, rather than requiring users to determine how certain inputs will affect object(s) within the scene, the user(s) are free to move virtual objects as if they were objects from the real-world, rather than virtual representations of objects.

Another benefit can include the continual feedback provided to the user(s). In particular, a real-time preview of any potential connection can provide increased confidence in the result of the potential connection to the user(s) while providing constant feedback to the user(s). For example, the visual preview can immediately make clear any constraints which would affect any potential connection to the user(s). In addition, when the preview indicates an incompatible connection, the AR system can provide an opportunity to give feedback that either: (i) educates the user(s) on why the two parts are incompatible, or (ii) illustrates how the combination is not 'physically' possible, e.g., as the resulting combination would result in objects overlapping other objects. The real-time nature of the preview can allow virtual objects to respond to virtual physical stimuli, which can include velocity, acceleration, and/or torque imparted to the virtual object(s) by the user(s) and external collisions, without interrupting the feedback loop. These aspects of the real-time preview also contribute to the natural user interface.

Yet another benefit is that the AR system can provide clear expectations to the user(s). That is, the real-time previews can make the result of an attempted connection known before the connecting action is completed by the user. The AR system can also provide supporting text informing the user(s) as to why the connection is valid or invalid. This creates a highly iterative learning environment, improving the speed at which user(s) can learn about attempted connections of connectable objects.

Still yet another benefit is the AR system's ability to provide multi-user support. Since the AR system can continuously run the physics simulation for all objects in the scene and provide previews of attempted connections in real-time, it is possible for multiple users to affect objects in the same scene simultaneously. In a first example, the AR system may include a virtual object representing a pipe. A first user can manipulate a virtual cap for the pipe and a second user can simultaneously manipulate a virtual pipe extension for the pipe. If both users attempt to connect their respective virtual objects to the pipe at the same time, the physics simulation can indicate that both objects cannot occupy the same space and prevent the connection of both virtual objects to the pipe from occurring.

Aspects of this disclosure can allow one or more user(s) to preview the result of connecting two connectable objects, prior to connecting the two connectable objects together. The system can be configured to provide the preview such that the user can know at a glance whether the attempted connection between connectable objects would violate rules of the simulation. For example, if the attempted connection would overlap with itself or another object in the scene, the system may provide an indication to the user which can be readily assessed by the user.

Figure 10A:
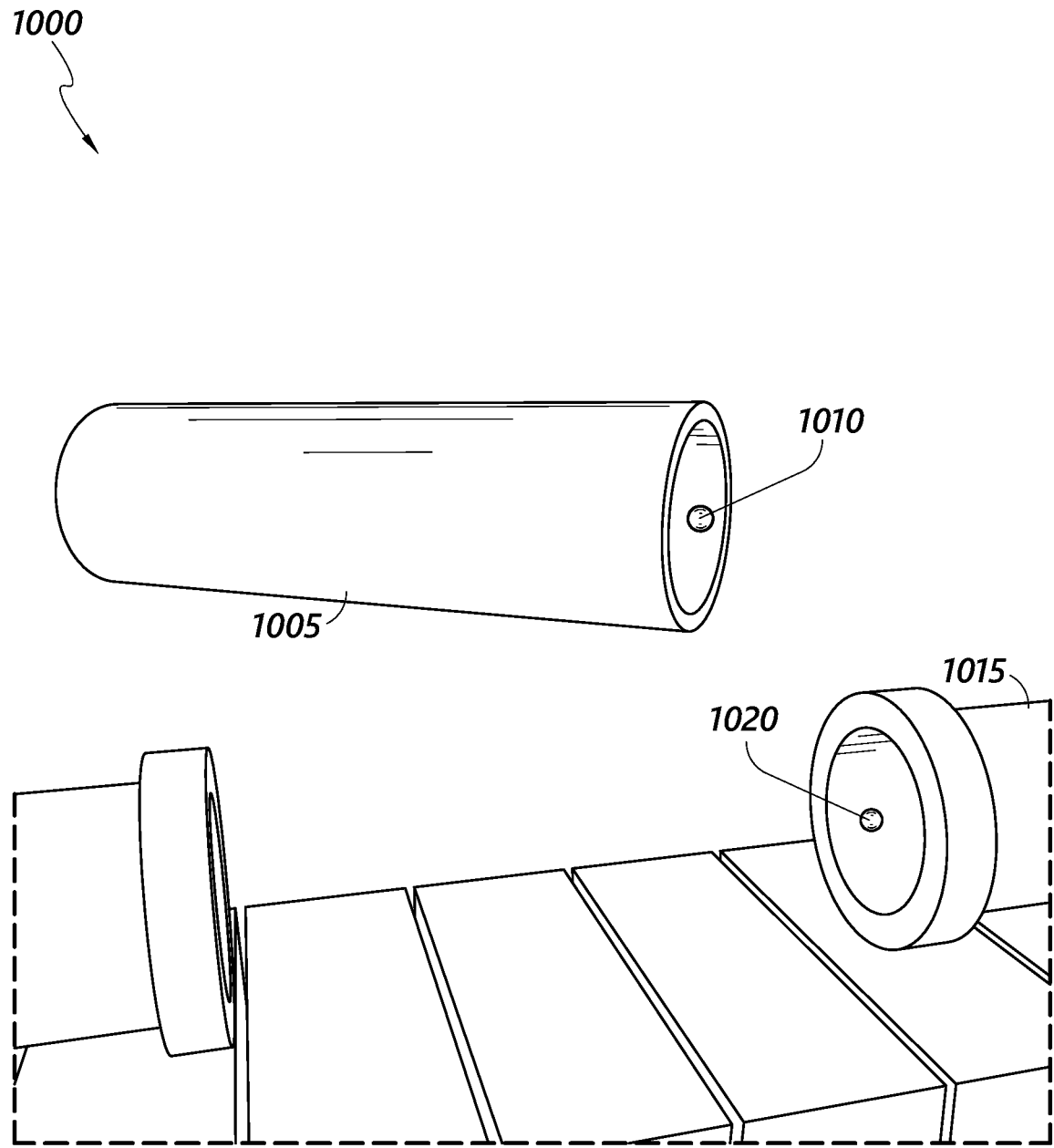
FIGS. 10A-10D are examples of views generated by a preview system for connectable objects and provided to a user via a display.

FIGS. 10A-10D are examples of views that can be generated by a preview system for connectable objects and provided to a user via a display. The preview system can comprise the preview system 690 described with reference to FIGS. 6A and 6B. The display may be configured to present virtual content to the user of the AR system as described with reference to the wearable system 200 of FIG. 2. FIG. 10A illustrates a view 1000 including an active object 1005 and a target object 1015. The active object 1005 includes an active node 1010 and the target object includes a target node 1020. As used herein, the term "node" can refer to a point in space relative to a corresponding virtual object. In some embodiments, the active object 1005 may be the object that is actively being manipulated. The AR system may be able to determine the final result of a preview connection between two connectable objects using the nodes on the two connectable objects. For example, when two connectable objects with nodes come into close proximity, the nodes can be used to determine the final result (e.g., the position, rotation, and/or compatibility) of the potential connection event. Thus, the active node 1010 and the target node 1020 can define respective points on the active object 1005 and the target object 1015 at which each of the active object 1005 and the target object 1015 can be connected to other connectable object(s).

Figure 10B:
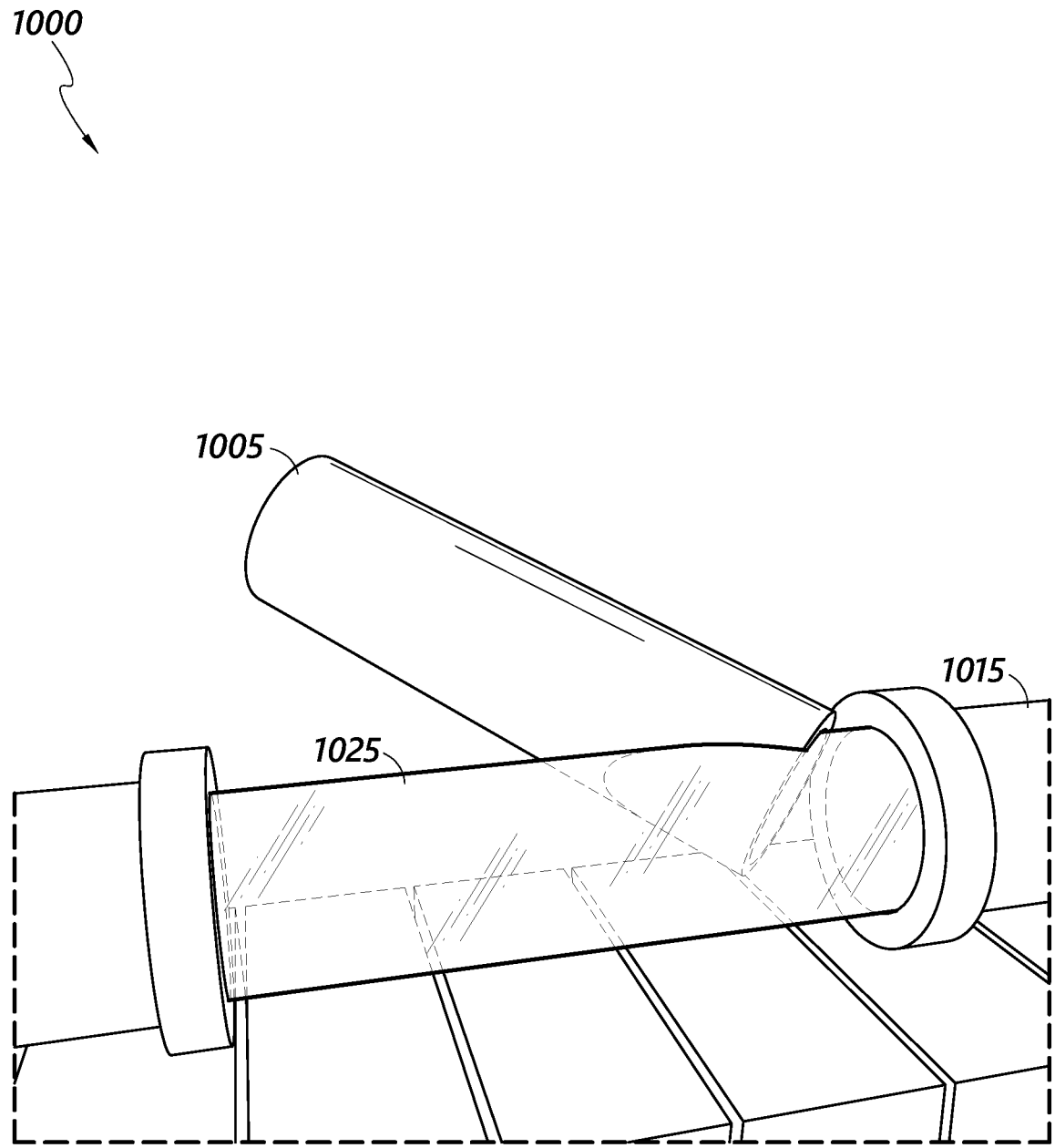

FIG. 10B illustrates the view 1000 including a preview 1025 of the active object 1005 connected to the target object 1015. As the user moves the active object 1005 closer to the target object 1015, the system may generate the preview 1025 of the connection between the active object 1005 and the target object 1015. A preview, such as the preview 1025 in FIG. 10B, may be a virtual object that represents another connectable object. Typically, it resembles its source object but with a different style or aesthetic. The preview 1025 may be shown in a final connected position between the active object 1005 and the target object 1015. In some embodiments, the system may generate the preview 1025 in response to the active node 1010 and the target node 1020 being less than a threshold distance apart from each other. In FIG. 10B, the active node 1010 is compatible with the target node 1020 and a potential connection between the active object 1005 and the target object 1015 does not overlap any other objects. Thus, the preview 1025 may include an indication that the potential connection is valid. In some embodiments, the indication may include representing the preview 1025 as a certain color (e.g., green). However, the indication may take other forms (e.g., an textual indication, a haptic indication, a graphical indication, etc.) in other embodiments.

Figure 10C:
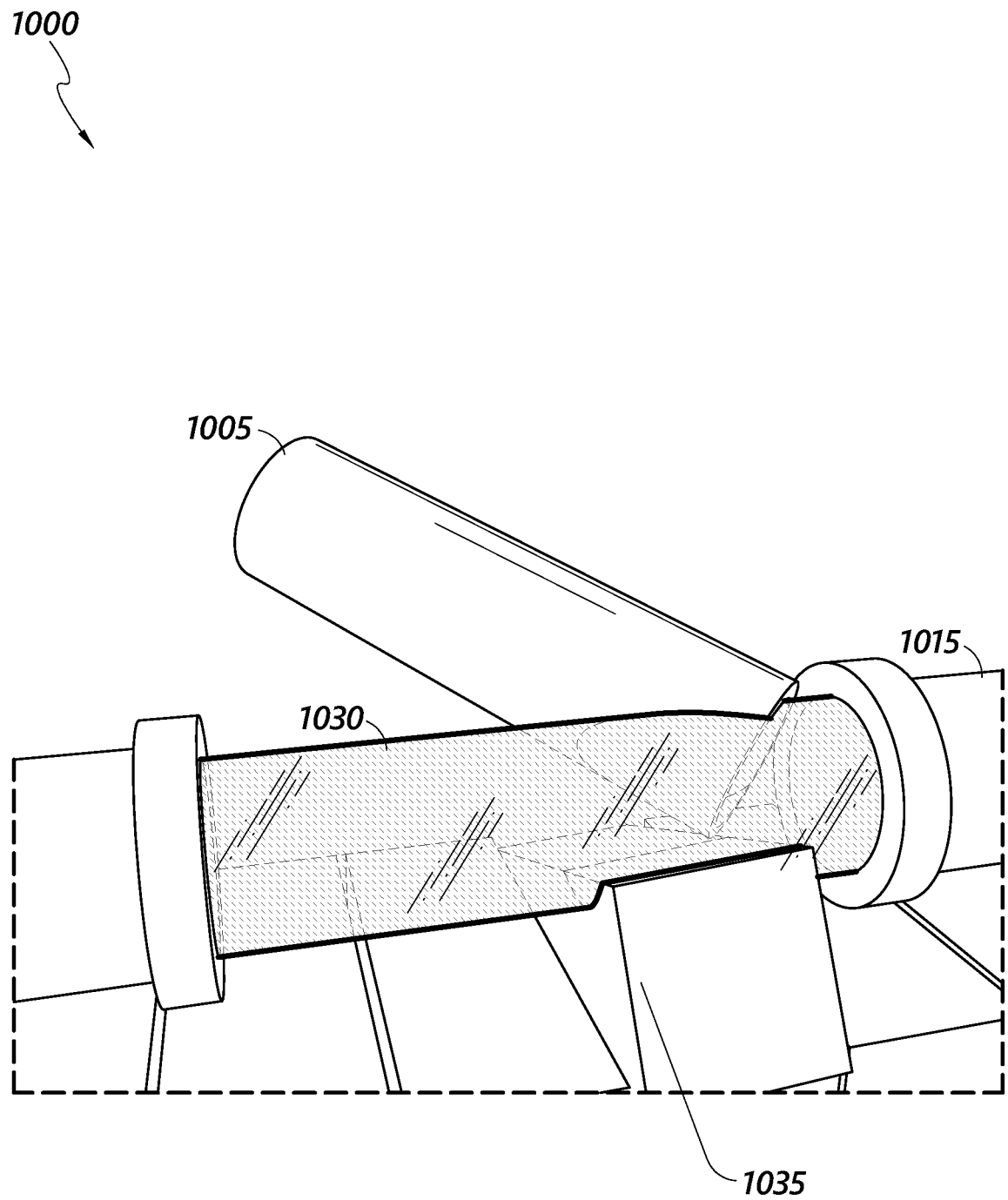

FIG. 10C illustrates the view 1000 including a preview 1030 of the active object 1005 connected to the target object 1015 and overlapping another object 1035. In particular, the object 1035 may be a non-connectable object which would occupy at least some of the same volume as the active object 1005, if the active object were moved into a final position connected to the target object 1015. For example, FIG. 10C shows a solid block 1035 that would prevent moving the active object 1005 (e.g., a pipe in this example) to the position shown as the preview 1030, because the pipe would have to pass through the solid block 1035, which is physically impermissible. Thus, the preview 1030 may include an indication that the potential connection is invalid due to the overlap between the preview 1030 and the object 1035. In some embodiments, the indication may include representing the preview 1030 as a certain color (e.g., red). However, the indication may take other forms (e.g., a textual indication, an acoustic indication, a haptic indication, etc.) in other embodiments.

Figure 10D:
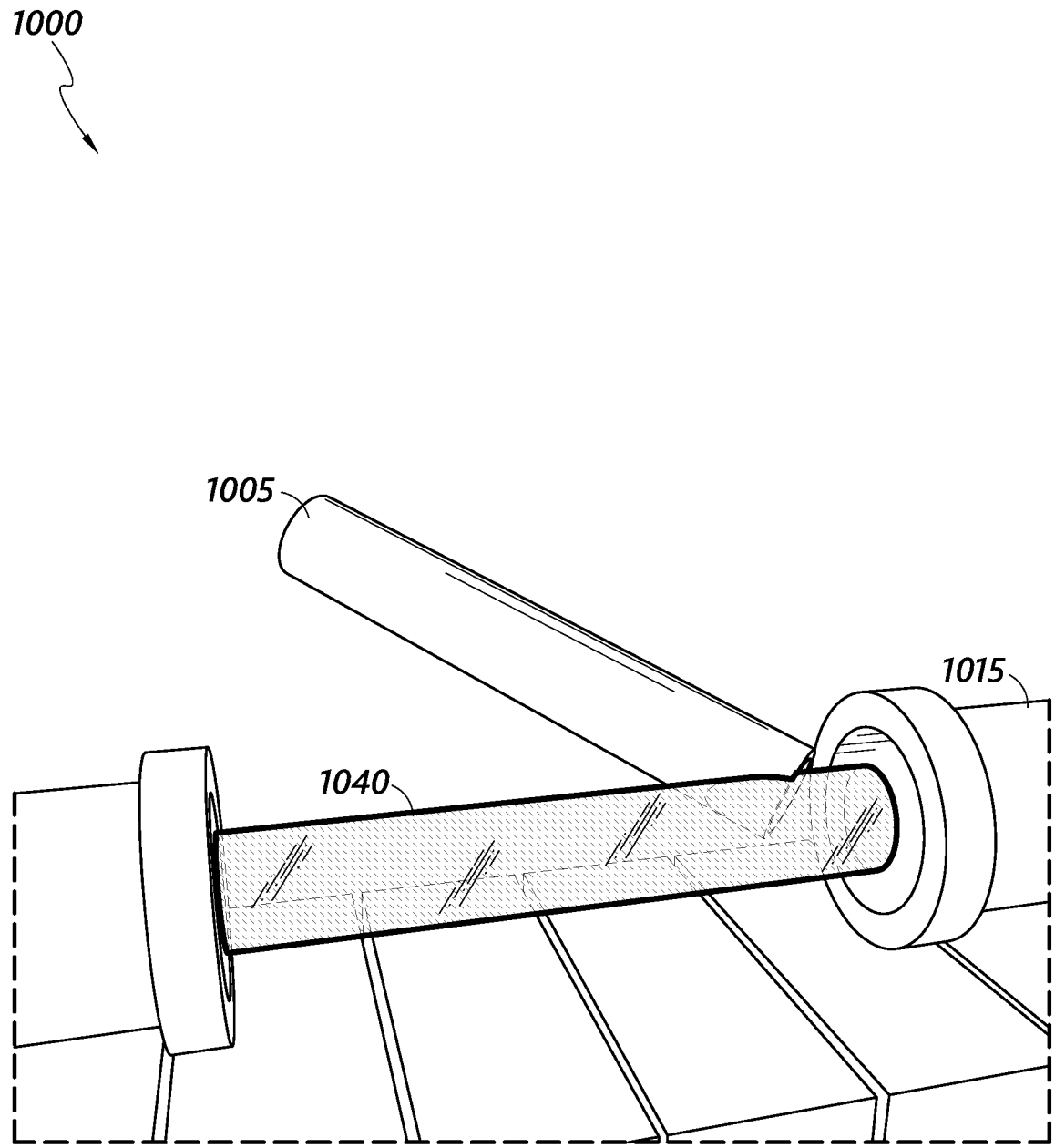

FIG. 10D illustrates the view 1000 include a preview 1040 of the active object 1005 connected to the target object 1015 where the nodes of the active object 1005 and the target object 1015 are incompatible. In the embodiment of FIG. 10D, the diameter of the active object 1005 pipe may be less than the diameter of the pipe fitting of the target object 1015. Each of the active node 1010 and the target node 1020 (see FIG. 10A) may include information related to which potential connections would be compatible (e.g., including the diameter of the pipe and pipe fitting) such that the system can determine the compatibility of a potential connection by comparing the information of the two nodes 1010 and 1020. Similar to FIG. 10C, the preview 1040 may include an indication that the potential connection is invalid due to the incompatibility of the active node 1010 and the target node 1020. In some embodiments, the indication may include representing the preview 1040 as a certain color (e.g., red). However, the indication may take other forms (e.g., a graphical indication, a textual indication, an acoustic indication, a haptic indication, etc.) in other embodiments.

In the embodiment of FIGS. 10A-10D, the connectable objects are shown as pipes. However, this is merely an illustration of one embodiment and aspects of this disclosure can also be applied to any other type of connectable objects.

Figure 11:
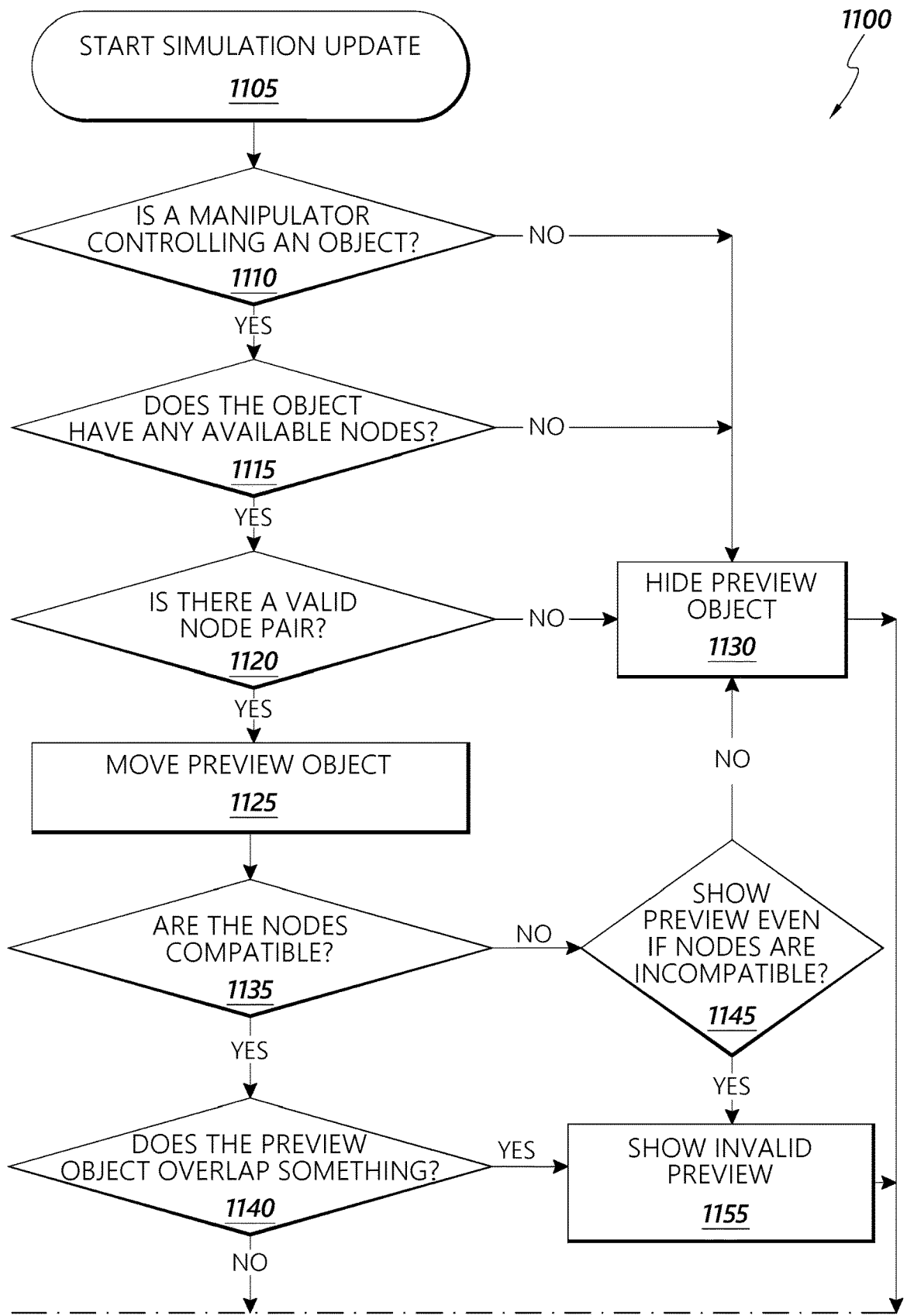
FIG. 11 illustrates a flowchart of an example method that can be performed to generate a preview of a connection between two connectable objects.
Figure 11:
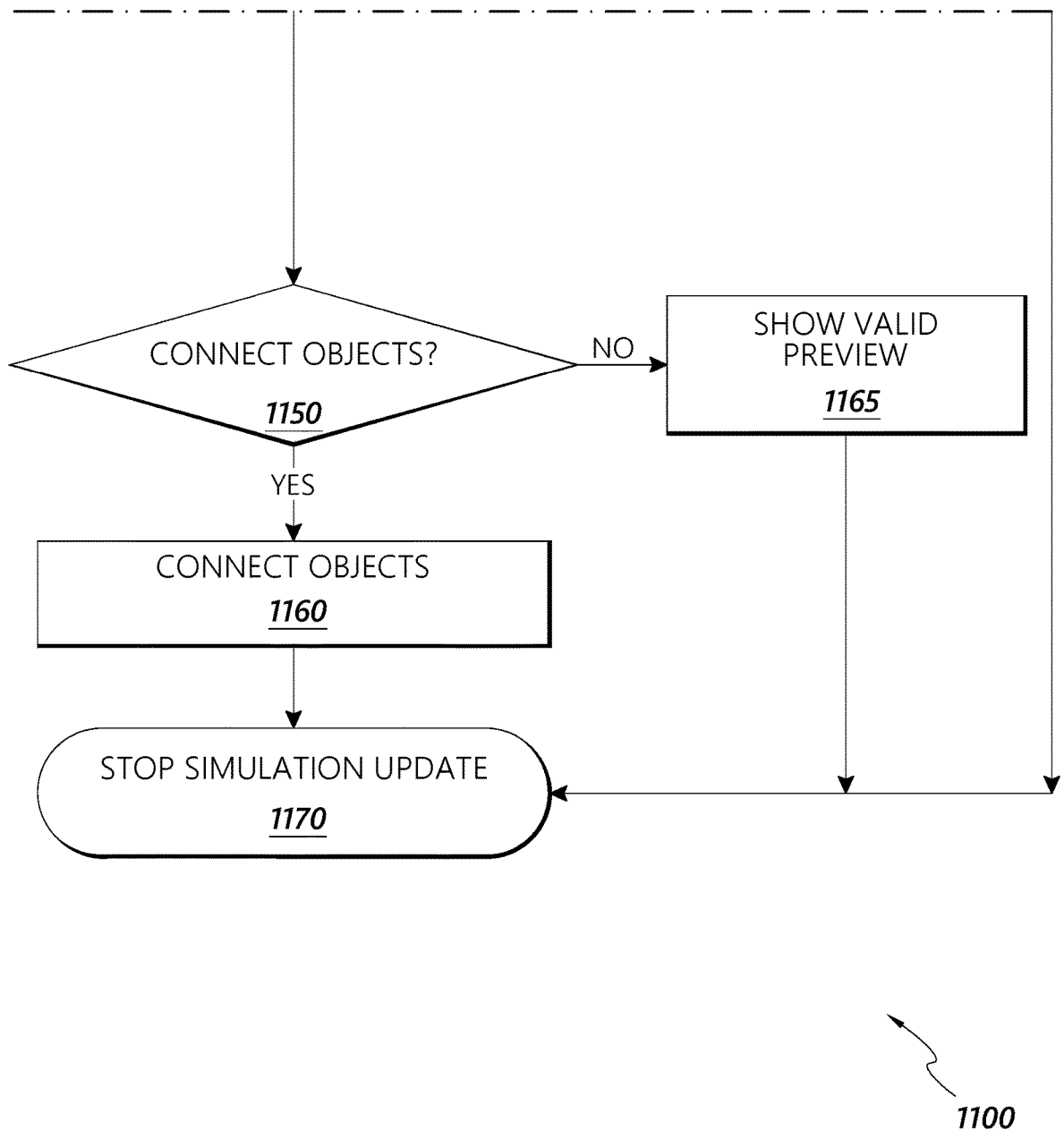

FIG. 11 illustrates a flowchart for an example method 1100 that can be applied to generate a preview of a connection between two connectable objects in accordance with aspects of this disclosure. The method 1100 illustrated in FIG. 11 can be applied to connectable objects of any type. The method 1100 can be performed by an AR system (or simply a "system"), for example, by the preview system 690 of the wearable system 200. Certain blocks may be performed by one or more elements of the AR system or can be offloaded for processing on a remote processing device (e.g., the remote processing module 270 of FIG. 2). In addition, the method 1100 is described as interacting with a single user, however, the method 1100 can be extended to receive input from multiple users, for example, multiple users (or user devices) 930a-930c communicating via the network 990 described with reference to FIG. 9.

At block 1105, the system starts the simulation update. If there are objects in the user's real-world environment that form part of the scene, the system can scan the environment and update the virtual representations of objects in the real-world stored in the virtual objects data store 692. The system can update the spatial information for each of the virtual objects in the list of virtual objects store in the virtual objects data store 692. The system can also obtain user input from the user input data store 694.

At block 1110, the system determines whether the user is manipulating any of the virtual objects from the list of virtual objects in the virtual object data store 692. The user input may indicate one or more of the virtual objects as being currently manipulated by the user. For example, the user may be holding a totem (also referred to as a user input device or manipulator) that is controlling one or more objects in the scene. The totem or manipulator may be an interface used to control an object in the scene. Any user input device can be used to manipulate objects within the scene. In implementations where the user can control objects using a totem, the system can, for each totem in the scene, add the objects currently being controlled by the totem to a list of active objects. When there are no objects in the list of active objects, the system may return "No" from block 1110, and continue at block 1130. When there is at least one object in the list of active objects, the system may return "Yes" from block 1110, and continue at block 1115.

At block 1115, the system can determine whether the active object(s) have any available nodes. A node can be determined to be available when the node is accepting connections to other nodes. For example, if a node is currently connected to another node, the node may not be accepting connections to other nodes. More generally, a node may permit connections up to a maximum threshold number of nodes (e.g., 0 (meaning the node does not permit connection to any other nodes), 1, 2, 3, 4, 5, or more) and not permit connections above the maximum threshold number. As another example, a node may accept connections to only certain types of nodes (e.g., a pipe node may only be connected to a pipe fitting node). The system can generate a list of active nodes including all available nodes from the active object(s). When there are no active nodes in the list of active nodes, the system may return "No" from block 1115, and continue at block 1130. When there is at least one active node in the list of active nodes, the system may return "Yes" from block 1115, and continue at block 1120.

At block 1120, the system can determine whether there is a valid node pair in the scene. The determination of whether there is a valid node pair may involve the system generating a list of target nodes including all available nodes from the scene from virtual objects other than the active objects. For example, the system can add every node in the scene that is (a) not included in the list of active nodes, and (b) determined to be available to the list of target nodes. The determination of whether there is a valid node pair may further involve generating a list of node pairs including each valid pair of nodes having one node from the list of active nodes and another node from the list of target nodes. As used herein, a node pair can refer to two nodes located, in some embodiments, on separate connectable objects that the system is evaluating for a potential connection. In some embodiments, the system can also preview a connection between two nodes of the same object, such that the object is connected to itself (e.g., a deformable ring in which the ends of the ring can be connected to each other). In these embodiments, the node pair can also include two nodes located on the same connectable object.

In some embodiments, generating the list of node pairs may involve, for each combination of pairs of nodes with one active node and one target node, comparing the information of the active node to the information of the target node and determining if the selected pair of nodes is a valid pair based on the determination. When a pair of nodes has been determined to be valid, the system can further create a node pair with the two nodes, determine a connection score for the pair of nodes, and add the created node pair and associated connection score to the list of node pairs. In some embodiments, the system may determine a connection score heuristic on the information associated with each of the pairs of nodes. The connection score heuristic may generate a score by which the pairs of nodes can be quantitatively compared. Depending on the particular implementation of the connection score heuristic, the highest score or the lowest score can be used to select one of the node pairs as an active node pair. One example connection score heuristic that can be used is based on the distance between the nodes in a given node pair. In this example, for each node pair, the system can determine the distance between the nodes and store the distance as the connection score. Using this example connection score heuristic, the node pair with the lowest score can be selected as the active node pair in block 1125, described below.

When there are no node pairs in the list of node pairs, the system may return "No" from block 1120, and continue at block 1130. When there is at least one node pair in the list of node pairs, the system may return "Yes" from block 1120, and continue at block 1125.

At block 1125, the system can move the preview object to be connected with the target object. For example, the system may select one of the node pairs from the list of node pairs as an active node pair. In some embodiments, the system may use an active node pair heuristic for selecting the active node pair. Continuing the above distance-based connection score heuristic example, the node pair having the lowest connection score can be selected as the active node pair in this example. The system can also determine the position and rotation of the preview based on the active node pair using, for example, the connected object location calculator system 684. The system can then move the preview to the position and rotation determined by the connected object location calculator system 684.

The method 1100 continues at block 1135, where the system can determine whether the nodes in the active node pair are compatible. In some embodiments, the system can determine that two nodes are compatible when if the information on the nodes indicates that the nodes are compatible using a compatibility heuristic. The compatibility heuristic may be specific to the type of objects for which the connection is being attempted. For example, one compatibility heuristic for connecting water pipes may determine that two objects are compatible when the following conditions are true: one of the objects is a pipe, the other object is a pipe joint, and both objects have the same diameter. When at least one of the conditions is false, the system can determine that the two nodes are incompatible. Other compatibility heuristics can be used for determining whether nodes of other types of objects are compatible. When the nodes are incompatible, the system may return "No" from block 1135, and continue at block 1145. When the nodes are compatible, the system may return "Yes" from block 1135, and continue at block 1140.

At block 1145, the system determines whether to show the preview even if the nodes are determined to be incompatible. This may be a setting selectable by the user of the system or a predetermined system setting. When the preview is not to be shown, the system may return "No" from block 1145, and continue at block 1130. When the preview is to be shown, the system may return "Yes" from block 1145, and continue at block 1155.

At block 1130, the system hides the preview object, preventing the preview from being displayed to the user. For example, the system may set the visual state of the preview object to invalid and prevent the preview object from being displayed. The method 1100 then continues at block 1170.

At block 1140, the system determines whether the preview object overlaps another object. The system may use the connected object overlap calculator system 686 to determine whether the preview object overlaps any other objects in the scene. For example, the connected object overlap calculator system 686 can determine if the preview overlaps a solid object in the scene, for example, by at least partially occupying the same volume as any other objects. In some embodiments, the connected object overlap calculator system 686 may exclude the preview's source object (e.g., the active object), the totem, and/or other virtual objects from the determination of whether the preview overlaps other objects in the scene. Such exclusions may improve usability and make it easier for the user to move objects close together. For example, as shown in FIG. 10B, although the preview 1025 overlaps the active object 1005 in the view 1000, the connected object overlap calculator system 686 may not indicate that an overlap has occurred in this situation. In some embodiments, the connected object overlap calculator system 686 returns a list of object(s) overlapping the preview object. When there are no objects in the list, the system may return "No" from block 1140, and continue at block 1150. When there is at least one object in the list, the system may return "Yes" from block 1140, and continue at block 1155.

At block 1155, the system may show an invalid preview to the user, displaying the invalid preview to the user. For example, the system may set the visual state of the preview object to valid and display the invalid preview object to the user. The system can also provide additional information related to why the preview is invalid to the user. This can include the reasons why the nodes are incompatible and/or an indication that another object overlaps the preview. In some embodiments, the system may refrain from displaying the invalid preview when the distance between the two nodes in the active node pair is greater than a threshold distance. The method 1100 then continues at block 1170.

At block 1150, the system determines whether to connect the objects. The system may determine whether to connect the object based on user input. For example, in response to the user moving the active object into a connected position and orientation with respect to the target object, the system may connect the two objects together. In another example, the system may provide the user with the option to connect the two objects, for example, via a selection dialog. When system determines not to connect the objects, the system may return "No" from block 1150, and continue at block 1165. When the system determines to connect the objects, the system may return "Yes" from block 1150, and continue at block 1160. In some embodiments, the system may automatically determine whether to connect the objects. For example, the system may be programmed to automatically connect the objects when the process is at block 1150.

At block 1165, the system may show a valid preview of the connection. For example, the system may set the visual state of the preview object to valid and display the preview in the connected position and rotation with respect to the target object. In some embodiments, the system may refrain from displaying the preview when the distance between the two nodes in the active node pair is greater than a threshold distance. The method 1100 then continues at block 1170.

At block 1160, the system may connect the active object to the target object. For example, the system may move the active object into a connected position and rotation with respect to the target object. The system can also hide the preview object, for example, by setting the visual state of the preview object to invalid. The method 1100 then continues at block 1170.

At block 1170, the system completes the update of the simulation and renders the scene for the user based on the updated parameters. For example, the rendered scene may include hiding the preview object (e.g., via block 1130), showing an invalid preview (e.g., via block 1155), showing a valid preview (e.g., via block 1165), or connecting the active object to the target object (e.g., via block 1160). Once the scene is rendered for display to the user, the method may return to block 1105 to update the simulation.

Additional Aspects

Aspect 1. An augmented reality (AR) system, comprising: a user input device configured to receive user input in an environment of a user of the AR system; a display configured to present virtual content to the user of the AR system; non-transitory computer storage configured to store: a list of two or more connectable virtual objects including spatial information for each of the connectable objects, wherein each connectable virtual object has at least one node, wherein a node defines a point in space with respect to the corresponding connectable virtual object at which the connectable virtual object can be connected to another connectable virtual object, and a list of one or more nodes for each of the connectable virtual objects; and a hardware processor in communication with the non-transitory computer storage, the hardware processor programmed to: receive user input from the user input device indicative of a manipulation of at least one of the connectable virtual objects; identify a first of the at least one of the connectable virtual objects as an active object based on the user input; identify at least one of the connectable virtual objects as a target object; determine that a node of the active object and a node of the target object are compatible; and generate a preview of the active object connected to the target object.

Aspect 2. The system of aspect 1, wherein the preview includes a visual indication of whether the connection between the active object and the target object is valid.

Aspect 3. The system of aspect 1 or aspect 2, wherein the spatial information includes at least one of a position, a rotation, or a scale for each of the connectable objects.

Aspect 4. The system of any one of aspects 1 to 3, wherein the hardware processor is further programmed to: update the spatial information for each of the connectable virtual objects based on a physics simulation.

Aspect 5. The system of any one of aspects 1 to 4, wherein the hardware processor is further programmed to: generate a list of active objects based on the user input, and generate a list of active nodes comprising available nodes from the nodes of the active objects.

Aspect 6. The system of aspect 5, wherein the hardware processor is further programmed to: generate a list of target nodes comprising available nodes from the nodes of connectable virtual objects excluding the active objects, generate a list of node pairs comprising valid pairs of nodes between the list of active nodes and the list of target nodes, and select the target object based on the list of node pairs.

Aspect 7. The system of aspect 6, wherein to select the candidate connectable object, the hardware processor is further programmed to: calculate a connection score for each of the node pairs using a connection score heuristic, select the node pair having a highest or lowest connection score as an active node pair, and select the target object sharing a node in the active node pair.

Aspect 8. The system of aspect 7, wherein the connection score heuristic comprises a measurement of a distance between the nodes for each of the node pairs.

Aspect 9. The system of aspect 7 or aspect 8, wherein to generate the preview, the hardware processor is further programmed to: reposition and rotate the preview to be connected to the target object via the active node pair.

Aspect 10. The system of any one of aspects 7 to 9, wherein the hardware processor is further programmed to: determine whether the nodes of the active node pair are compatible using a compatibility heuristic, and generate a visual indication of whether the connection between the active object and the candidate connectable object is valid based on the determination of whether the nodes of the active node pair are compatible.

Aspect 11. The system of any one of aspects 7 to 9, wherein the hardware processor is further programmed to: determine whether the preview overlaps another connectable object or a non-connectable object, and generate a visual indication of whether the preview overlaps the other connectable object or the non-connectable object.

Aspect 12. The system of any one of aspects 1 to 11, wherein the list of connectable objects includes at least one virtual connectable object and at least one virtual representation of a real-world connectable object.

Aspect 13. The system of any one of aspects 1 to 12, wherein the list of connectable objects includes only virtual connectable objects.

Aspect 14. The system of any one of aspects 1 to 13, wherein the hardware processor is further programmed to: determine that the nodes of the active object are not within a threshold distance of any nodes of the other connectable objects, and hide the preview from being displayed in response to determining that the nodes of the active object are not within the threshold distance of any of the nodes of the other connectable objects.

Aspect 15. The system of any one of aspects 1 to 14, wherein the user input device comprises a plurality of user input devices, and wherein the hardware processor is further programmed to: receive input from a plurality of users via the user input devices, generate a list of active objects based on the input received from the plurality of user input devices, and for each of the active objects, generate a preview the corresponding active object connected to a corresponding target object.

Aspect 16. The system of any one of aspects 1 to 15, wherein the user input device comprises an outward facing camera configured to detect gestures of the user.

Aspect 17. A method comprising: under control of a preview system for connectable virtual objects comprising computing hardware: receiving user input from a user input device indicative of a manipulation of at least one of a plurality of connectable virtual objects from a list of connectable virtual objects, the list of connectable virtual objects including spatial information for each of the connectable virtual objects and a list of one or more nodes for each of the connectable virtual objects, wherein each connectable virtual object has at least one node, and wherein a node defines a point in space with respect to the corresponding connectable virtual object at which the connectable virtual object can be connected to another connectable virtual object; identifying a first of the at least one of the connectable virtual objects as an active object based on the user input; identifying at least one of the connectable virtual objects as a target object; determining that a node of the active object and a node of the target object are compatible; and generate a preview of the active object connected to the target object.

Aspect 18. The method of aspect 17, wherein the preview includes a visual indication of whether the connection between the active object and the target object is valid.

Aspect 19. The method of aspect 17 or aspect 18, wherein the spatial information includes at least one of a position, a rotation, or a scale for each of the connectable objects.

Aspect 20. The method of any one of aspects 17 to 19, further comprising: updating the spatial information for each of the connectable virtual objects based on a physics simulation.

Aspect 21. The method of any one of aspects 17 to 20, further comprising: generating a list of active objects based on the user input, and generating a list of active nodes comprising available nodes from the nodes of the active objects.

Aspect 22. The method of aspect 21, further comprising: generating a list of target nodes comprising available nodes from the nodes of connectable virtual objects excluding the active objects, generating a list of node pairs comprising valid pairs of nodes between the list of active nodes and the list of target nodes, and selecting the target object based on the list of node pairs.

Aspect 23. The method of aspect 22, wherein to select the candidate connectable object, the method further comprises: calculating a connection score for each of the node pairs using a connection score heuristic, selecting the node pair having a highest or lowest connection score as an active node pair, and selecting the target object sharing a node in the active node pair.

Aspect 24. The method of aspect 23, wherein the connection score heuristic comprises a measurement of a distance between the nodes for each of the node pairs.

Aspect 25. The method of aspect 23 or aspect 24, wherein to generate the preview, the method further comprises: repositioning and rotating the preview to be connected to the target object via the active node pair.

Aspect 26. The method of any one of aspects 23 to 25, further comprising: determining whether the nodes of the active node pair are compatible using a compatibility heuristic, and generating a visual indication of whether the connection between the active object and the candidate connectable object is valid based on the determination of whether the nodes of the active node pair are compatible.

Aspect 27. The method of any one of aspects 23 to 26, further comprising: determining whether the preview overlaps another connectable object or a non-connectable object, and generating a visual indication of whether the preview overlaps the other connectable object or the non-connectable object.

Aspect 28. The method of any one of aspects 17 to 27, wherein the list of connectable objects includes at least one virtual connectable object and at least one virtual representation of a real-world connectable object.

Aspect 29. The method of any one of aspects 17 to 28, wherein the list of connectable objects includes only virtual connectable objects.

Aspect 30. The method of any one of aspects 17 to 29, further comprising: determining that the nodes of the active object are not within a threshold distance of any nodes of the other connectable objects, and hiding the preview from being displayed in response to determining that the nodes of the active object are not within the threshold distance of any of the nodes of the other connectable objects.

Aspect 31. The method of any one of aspects 17 to 30, wherein the user input device comprises a plurality of user input devices, and wherein the method further comprises: receiving input from a plurality of users via the user input devices, generating a list of active objects based on the input received from the plurality of user input devices, and for each of the active objects, generating a preview the corresponding active object connected to a corresponding target object.

Aspect 32. The method of any one of aspects 17 to 31, wherein the user input device comprises an outward facing camera configured to detect gestures of the user.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time. As another example, the preview system for connectable objects can be computationally complex and may, in some cases, require hardware processors to perform the preview process.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The invention claimed is:

1. An augmented reality (AR) system, comprising:
   a user input device configured to receive user input in an environment of a user of the AR system, the environment having a plurality of connectable virtual objects;
   a display configured to present virtual content to the user of the AR system;
   non-transitory computer storage configured to store software instructions; and
   a hardware processor in communication with the non-transitory computer storage, the hardware processor configured to execute the software instructions to:
   identify at least one of the connectable virtual objects as an active connectable virtual object based on user input received from the user input device;
   identify at least one of the connectable virtual objects as a target connectable virtual object;
   determine if the active connectable virtual object and the target connectable virtual object are compatible for connection; and
   generate a preview of the active connectable virtual object connected to the target connectable virtual object based on the determination of compatibility.

2. The system of claim 1, wherein the hardware processor is further programmed to:
   determine whether the preview overlaps another object; and
   generate a visual indication of whether the preview overlaps the another object.

3. The system of claim 1, wherein the hardware processor is further programmed to:
   determine that the active connectable virtual object and the target connectable virtual object are not within a threshold distance of each other; and
   hide the preview from being displayed in response to determining that the active connectable virtual object and the target connectable virtual object are not within the threshold distance of each other.

4. The system of claim 1, wherein the hardware processor is further programmed to:
   receive input from a plurality of users;
   generate a list of active connectable virtual objects based on the input received from the plurality of users; and
   for each of the active connectable virtual objects, generate a preview of the active connectable virtual objects connected to corresponding target connectable virtual objects.

5. The system of claim 1, wherein the one or more target connectable virtual objects includes at least one virtual object and at least one virtual representation of a real-world object.

6. The system of claim 1, wherein the preview includes a visual indication of whether connection between the active connectable virtual object and the selected target connectable virtual object is valid.

7. The system of claim 1, wherein, to generate the preview, the hardware processor is further programmed to:
   reposition and rotate the active connectable virtual object to be coupled to the selected target connectable virtual object.

8. The system of claim 1,
   wherein the active connectable virtual object includes one or more connection node defining a portion of the active connectable virtual object that is connectable to the one or more target connectable virtual objects, each of the one or more target connectable virtual objects include one or more target connection nodes; and
   wherein the hardware processor is further programmed to:
   generate a list of the one or more connection nodes for the active connectable virtual object.

9. The system of claim 8, wherein the hardware processor is further programmed to:
   generate a list of target nodes comprising available target nodes from the target nodes of target connectable virtual objects excluding the active connectable virtual object,
   generate a list of node pairs comprising valid pairs of nodes between the list of active nodes and the list of target nodes; and
   select the target connectable virtual object based on the list of node pairs.

10. The system of claim 9, wherein to select the target connectable virtual object, the hardware processor is further programmed to:
    calculate a connection score for each of the node pairs using a connection score heuristic,
    select the node pair having a highest or lowest connection score as an active node pair, and
    select the target connectable virtual object sharing a node in the active node pair.

11. The system of claim 10, wherein the connection score heuristic comprises a measurement of a distance between the nodes for each of the node pairs.

12. The system of claim 10, wherein the hardware processor is further programmed to:
    determine whether the nodes of the active node pair are compatible using a compatibility heuristic, and
    generate a visual indication of whether the connection between the active connectable virtual object and the target connectable virtual object is valid based on the determination of whether the nodes of the active node pair are compatible.

13. The system of claim 1, wherein the hardware processor is further programmed to:
    responsive to user input to connect the active connectable virtual object to the target connectable virtual object, connect the active connectable virtual object with the target connectable virtual object; and
    stop display of the preview in response to connecting the active connectable virtual object with the target connectable virtual object.

14. A computerized method, performed by a computing system having one or more hardware computer processors and one or more non-transitory computer readable storage device storing software instructions executable by the computing system to perform the computerized method comprising:
    receiving user input in an environment of a user of the computing system, the environment having a plurality of connectable virtual objects;
    identifying, with the computing system, at least one of the connectable virtual objects as an active connectable virtual object based on user input received from the user input device;
    identifying, with the computing system, at least one of the connectable virtual objects as a target connectable virtual object;
    determining, with the computing system, if the active connectable virtual object and the target connectable virtual object are compatible for connection; and
    generating, with the computing system on a visual display, a preview of the active connectable virtual object connected to the target connectable virtual object based on the determination of compatibility.

15. The method of claim 14, further comprising:
determining whether the preview overlaps another object; and
generating a visual indication of whether the preview overlaps the another object.

16. The method of claim 14, further comprising:
determining that the active connectable virtual object and the target connectable virtual object are not within a threshold distance of each other; and
hiding the preview from being displayed in response to determining that the active connectable virtual object and the target connectable virtual object are not within the threshold distance of each other.

17. The method of claim 14, further comprising:
receiving input from a plurality of users;
generating a list of active connectable virtual objects based on the input received from the plurality of users; and
for each of the active connectable virtual objects, generating a preview of the active connectable virtual objects connected to corresponding target connectable virtual objects.

18. The method of claim 14, wherein the one or more target connectable virtual objects includes at least one virtual object and at least one virtual representation of a real-world object.

* * * * *